US012607065B2

(12) United States Patent
Major et al.

(10) Patent No.: US 12,607,065 B2
(45) Date of Patent: Apr. 21, 2026

(54) FOLDING ELEVATED WORKING PLATFORM

(71) Applicant: LITTLE GIANT LADDER SYSTEMS, LLC, Springville, UT (US)

(72) Inventors: Aaron B. Major, Nephi, UT (US); Steven S. Miner, Springville, UT (US); N. Ryan Moss, Mapleton, UT (US); Darius S. Penrod, Elberta, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 1196 days.

(21) Appl. No.: 17/525,121

(22) Filed: Nov. 12, 2021

(65) Prior Publication Data

US 2022/0145700 A1 May 12, 2022

Related U.S. Application Data

(60) Provisional application No. 63/112,279, filed on Nov. 11, 2020.

(51) Int. Cl.
*E06C 7/18* (2006.01)
*E06C 1/393* (2006.01)

(52) U.S. Cl.
CPC .............. *E06C 1/393* (2013.01); *E06C 7/185* (2013.01)

(58) Field of Classification Search
CPC ... E06C 1/14; E06C 1/39; E06C 1/393; E06C 7/18; E06C 7/182; E06C 7/185; E06C 7/16; E06C 7/165
See application file for complete search history.

(56) References Cited

U.S. PATENT DOCUMENTS

| | | | | |
|---|---|---|---|---|
| 4,182,431 A | | 1/1980 | Wing et al. | |
| 5,722,507 A | * | 3/1998 | Kain | E06C 1/393 182/104 |

(Continued)

FOREIGN PATENT DOCUMENTS

| | | | |
|---|---|---|---|
| CN | 103233675 A | | 8/2013 |
| CN | 203308376 U | | 11/2013 |

(Continued)

OTHER PUBLICATIONS

International Search Report and Written Opinion for PCT Application No. PCT/US2021/072388 dated Feb. 2, 2022.

*Primary Examiner* — Jessica L Laux
(74) *Attorney, Agent, or Firm* — Dorsey & Whitney LLP

(57) ABSTRACT

Elevated work platform apparatuses, as well as associated methods, are provided. One elevated platform apparatus comprises a first assembly having a pair of rails coupled with a plurality of rungs, a second assembly hingedly coupled with the first assembly, a platform pivotally coupled with the first assembly and configured to extend to, and engage a portion of, the second assembly. The apparatus further includes a cage associated with the platform. The cage may include a guard structure including a pair of gates. A locking mechanism may be associated with the platform and include a latch member for engagement with a cross-member of the second assembly. Actuation of the locking member may include a "pulling" action by a user standing in front of the apparatus and reaching between the two rails of the first assembly.

8 Claims, 19 Drawing Sheets

(56) References Cited

U.S. PATENT DOCUMENTS

| | | | | |
|---|---|---|---|---|
| 5,762,163 | A * | 6/1998 | Kain | E06C 1/393<br>182/162 |
| 6,026,933 | A * | 2/2000 | King | E06C 1/393<br>182/161 |
| 6,427,805 | B1 * | 8/2002 | Gibson | E06C 1/387<br>182/165 |
| 7,086,499 | B2 | 8/2006 | Moss | |
| 7,104,361 | B2 * | 9/2006 | Walsh | E06C 7/14<br>182/115 |
| 9,016,434 | B2 | 4/2015 | Moss et al. | |
| 10,138,679 | B2 * | 11/2018 | Russell | E06C 7/185 |
| 12,241,309 | B2 * | 3/2025 | Parker | E06C 1/393 |
| 2009/0229918 | A1 | 9/2009 | Moss et al. | |
| 2013/0186710 | A1 * | 7/2013 | Moss | E06C 7/185<br>182/104 |
| 2017/0226803 | A1 | 8/2017 | Russell et al. | |
| 2019/0078385 | A1 | 3/2019 | Moss et al. | |
| 2019/0100964 | A1 * | 4/2019 | Moss | E06C 1/397 |

FOREIGN PATENT DOCUMENTS

| | | | |
|---|---|---|---|
| CN | 203925264 | U | 11/2014 |
| DE | 202007000406 | U1 | 2/2008 |
| KR | 200146389 | Y1 | 6/1999 |

* cited by examiner

FOLDING ELEVATED WORKING PLATFORM

CROSS-REFERENCE TO RELATED APPLICATIONS

This application claims the benefit of U.S. Provisional Application No. 63/112,279, filed on 11 Nov. 2020, which is hereby incorporated by reference herein in its entirety.

BACKGROUND

Ladders are one type of apparatus conventionally used to provide a user with improved access to elevated locations that might otherwise be difficult to reach. One of the advantages of ladders is their convenience. Ladders are easily transported from one location to another, generally easy to set up and use at a specific location, and easy to store when not in use. Ladders come in many sizes and configurations, such as straight ladders, extension ladders, stepladders, and combination step and extension ladders. So-called combination ladders may incorporate, in a single ladder, many of the benefits of multiple ladder designs.

In an effort to provide more secure, safe and stable access to elevated locations, users often employ various accessories. For example, planks or other structures are sometimes combined with two or more ladders to act as a platform or scaffolding. In one particular example, so-called ladder jacks are often utilized in conjunction with a pair of ladders to provide a support for one or more wooden planks (e.g., 2 inch by 10 inch planks or 2 inch by 12 inch planks). Such a configuration enables a user to work on an elevated surface that exhibits a larger support surface area than that of the rung of a ladder and, thus, enables the user to work in a larger area without having to move a ladder multiple times. In another example, an attachment sometimes referred to as a work platform may be coupled to one or more rungs of a ladder in an effort to provide more surface area for the user to stand on, improving their stability and comfort. However, breaking down or disassembling such a configuration, moving all of the components and then setting them up again can be time consuming and require considerable effort. Additionally, there are typically no safety constraints or user restraints used in such a configuration, making the use of planks a potential safety concern.

It is becoming increasingly common to require users to “tie off” or otherwise secure themselves when using a ladder or other elevating apparatus on a job site. Such a requirement may be instituted by a property owner, by an employer, or by a governmental body such as OSHA (Occupational Safety and Health Administration) to reduce the risk of injury from a fall. However, users of ladders (or other elevated support structures) sometimes find such requirements to be a nuisance and some may even try to avoid such requirements. At a minimum, users of a ladder will typically find that such requirements take additional time, making the worker less efficient at completing their task, even if they are safer while working.

It is also known that many users will often climb higher on a ladder than is recommended for the specific ladder—sometimes to the highest rung of a stepladder or even on the top cap of a stepladder—even though explicit warnings are provided by the manufacturer of the ladder against such behavior. Climbing beyond the highest recommended rung can make the ladder unstable. Additionally, the user may become unstable when climbing beyond a recommended height because, for example, they may not have any additional structure to lean against or grasp with a free hand while standing at or near the very top of the ladder.

Further, while there have been some attempts to provide solutions to the issues and concerns noted above, some proposed solutions have resulted in large apparatuses that are difficult to maneuver and pose issues in the storing, transporting and shipping such apparatuses.

As such, the industry is continually looking for ways to improve the experience of using ladders and elevated platforms and to provide the users of such apparatuses with more efficient, effective, safe and comfortable experiences.

SUMMARY

In one aspect, an elevated platform apparatus includes a first assembly having a first pair of rails coupled with a plurality of rungs, a second assembly having a second pair of rails, the second assembly being pivotally coupled with the first assembly, a platform pivotally coupled to the first assembly, a cage associated with the platform, the cage including a guard structure having a pair of arms, with each arm being pivotally coupled to an associated rail of the first pair of rails, with a utility tray extending between and coupled to the pair of arms, and with a pair of gates. Each gate can be pivotally coupled to an associated arm of the pair of arms, and each gate can be configured to swing in a first direction upon a user stepping on to the platform from the first assembly and to swing back to a closed position after the user is standing on the platform. At least one gate can be limited from being displaced in a second direction oriented opposite the first direction and beyond the closed position.

In some embodiments, the cage further includes a cross-member extending between and coupled with the second pair of rails.

In some embodiments, the first assembly and the second assembly are configured to pivot relative to each other between a deployed state and a collapsed state, where when the first and second assemblies are in the deployed state, the platform extends from the first assembly and engages a portion of the second assembly such that an upper surface of a deck of the platform is substantially coplanar with an upper surface of an uppermost rung of the plurality of rungs. Other technical features may be readily apparent to one skilled in the art from the following figures, descriptions, and claims.

In another aspect of the disclosure, an elevated platform apparatus includes a first assembly having a first pair of rails coupled with a plurality of rungs, a second assembly having a second pair of rails and a cross member extending between and coupled to the second pair of rails, with the second assembly being pivotally coupled with the first assembly, the first assembly and second assembly being displaceable between a deployed state and a collapsed state, a platform pivotally coupled to the first assembly, with the platform having a deck with an upper surface that is substantially coplanar with an upper surface of an uppermost rung of the plurality of rungs when the first and second assemblies are in the deployed state, a latch mechanism associated with the platform, with the latch mechanism including a latch member configured to be selectively displaced away from the cross member and toward the uppermost rung to disengage the latch member from the cross-member, and a cage associated with the platform, with the cage including a guard structure pivotally coupled to the first pair of rails and a pair of gates, with each gate being pivotally coupled to the guard structure.

In some embodiments, the latch mechanism is positioned in an opening formed in the deck of the platform.

In some embodiments, each gate member includes a cammed surface configured to engage a biased abutment member coupled with the guard structure.

In some embodiments, each gate is configured to swing in a first direction upon a user stepping on to the platform from the first assembly, and to swing back to a closed position after the user is standing on the platform, the at least one gate also being limited from being displaced in a second direction, opposite the first direction, beyond the closed position. Other technical features may be readily apparent to one skilled in the art from the following figures, descriptions, and claims.

In some embodiments, the elevated platform apparatus may also include at least one first link member having a first end pivotally coupled with the platform at a first connection location, with the at least one first link member having a second end pivotally coupled with the guard structure.

The elevated platform apparatus may also include further include at least one second link member having a first end pivotally coupled with the platform at a second connection location, with the at least one second link member having a second end pivotally coupled to an associated rail of the second pair of rails.

In some embodiments, the second connection location is positioned between the first connection location and the associated rail of the second pair of rails.

In some embodiments, the second end of the at least one first link member is pivotally coupled to an associated arm of the pair of arms of the guard structure.

In some embodiments, the second end of the at least one first link member is pivotally coupled to the associated arm at a location between an associated gate member of the pair of gates and an associated rail of the first pair of rails.

The elevated platform apparatus may also include at least one first link member slidably coupled to a rail of the first pair of rails.

In some embodiments, a latch member selectively locks the platform with a portion of the second assembly.

In some embodiments, when the first and second assemblies are in the collapsed state, the pair of arms are substantially coplanar with the second pair of rails.

In some embodiments, when the first and second assemblies are in the collapsed state, the platform is positioned within a volumetric envelope defined by a front surface of the first pair of rails and a rear surface of the second pair of rails.

In some embodiments, the latch mechanism includes a first body member fixed to the deck and a second body member slidably coupled with the first body member, with the second body member including the latch member.

In some embodiments, the elevated platform apparatus may also include a biasing member positioned between the first body member and the second body member, with the biasing member biasing the second body member toward the cross member.

In some embodiments, the second body member includes an undulating surface for engagement by a user's fingers.

In some embodiments, the latch member includes a ramped surface configured to engage the cross member and displace the second body member when the first and second assemblies are transitioning from the collapsed state to the deployed state. Other technical features may be readily apparent to one skilled in the art from the following figures, descriptions, and claims.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
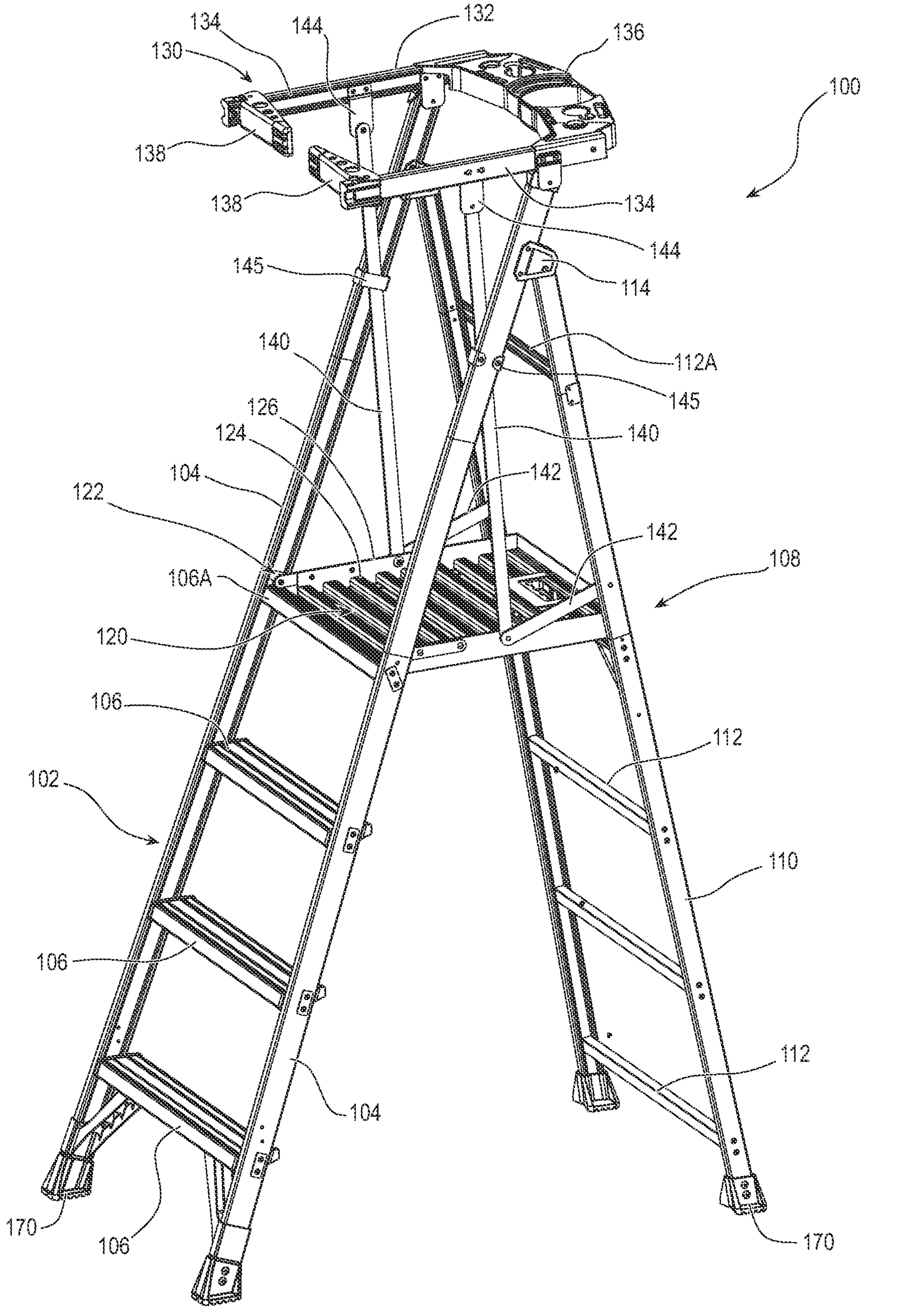
FIG. 1 is a front-side perspective view of an elevated platform apparatus in a deployed or operational state in accordance with an embodiment of the present invention.
Figure 2:
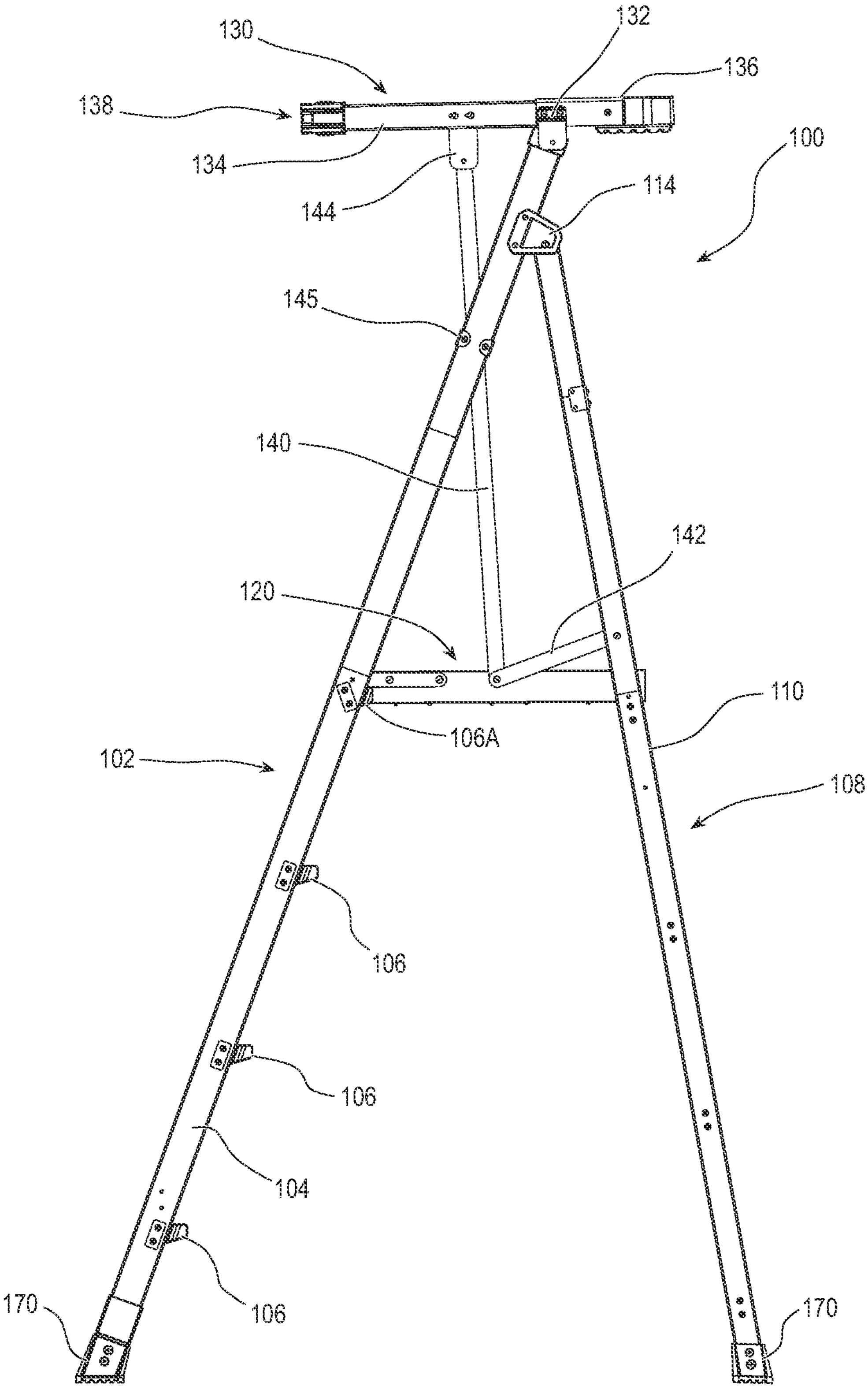
FIG. 2 is a side view of the elevated platform apparatus of FIG. 1 in a deployed or operational state.
Figure 3:
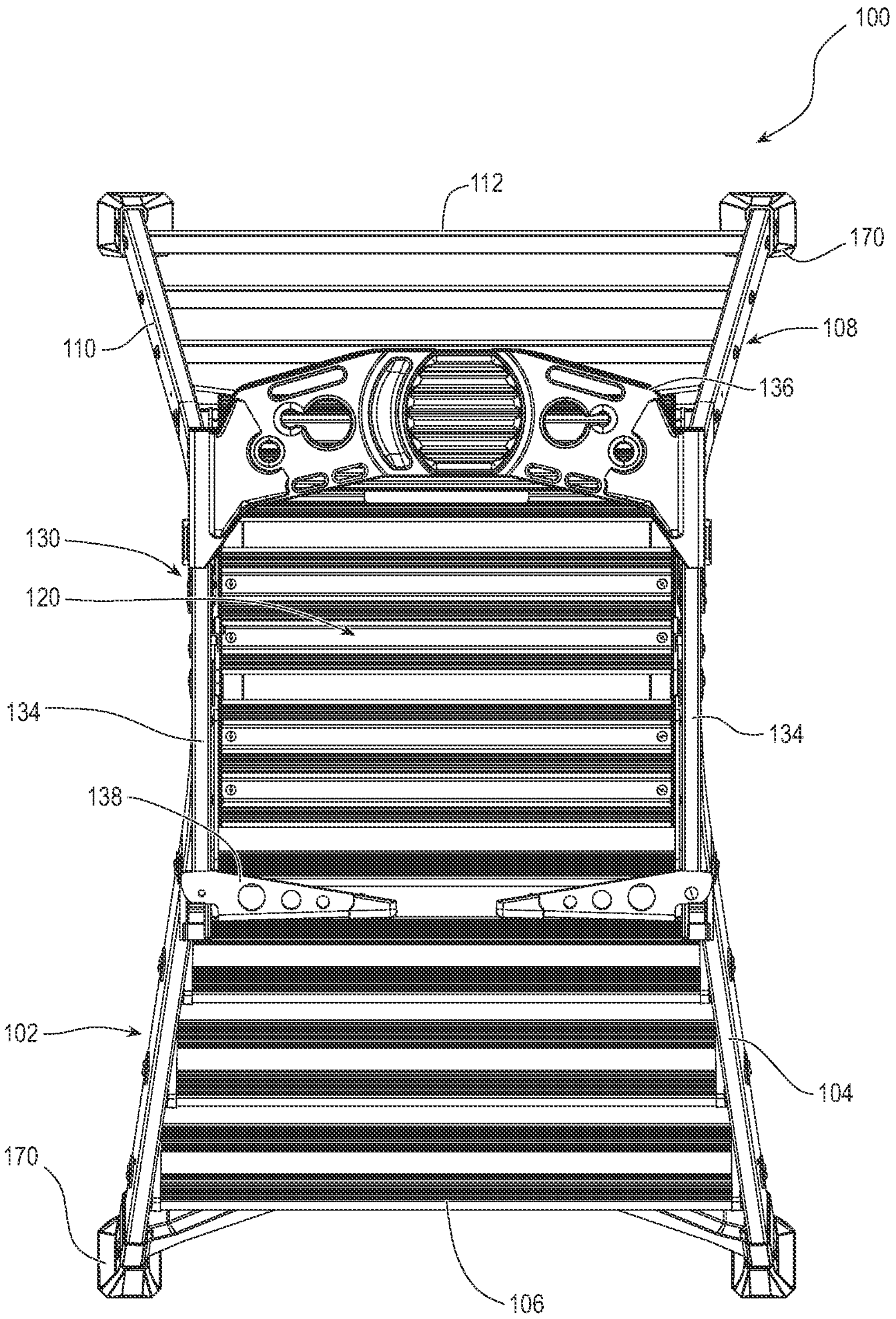
FIG. 3 is a top view of the elevated platform apparatus of FIG. 1 a deployed or operational state.
Figure 4:
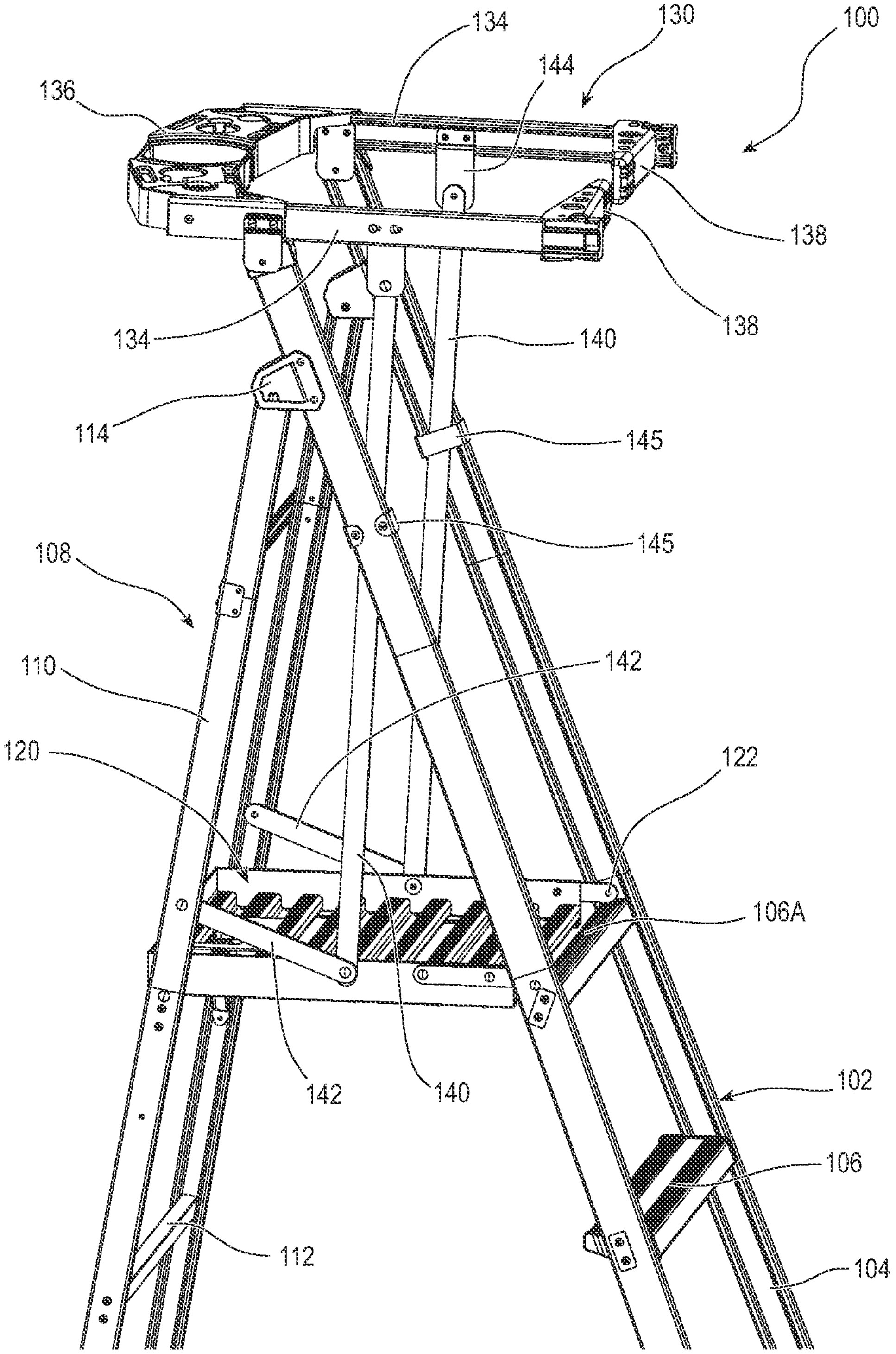
FIG. 4 is a front-side perspective view of an upper portion of the elevated platform apparatus shown in FIG. 1 in a deployed state.

Referring generally to FIGS. 1-7, an elevated platform apparatus 100 is shown (referred to herein as the "apparatus" for purposes of convenience). The apparatus 100 includes a first assembly 102 having a pair of spaced apart rails 104 with a plurality of rungs 106 extending between, and coupled to, the rails 104. The rungs 106 are substantially evenly spaced, parallel to one another, and are configured to be substantially level when the apparatus 100 is in an orientation for intended use, so that they may be used as "steps" for a user to ascend (or descend) the apparatus 100. While the apparatus 100 shown in drawings depicts a certain number of rungs 106 rungs, it is noted that the present apparatus 100 may be configured at a variety of heights, with any number of rungs.

Additionally, while the apparatus is shown in the drawings as a "fixed height" apparatus, in other embodiments the first assembly 102 may include "outer" and "inner" assemblies that enable the height of the apparatus 100 to be selectively adjusted. For example, such an assembly is described in U.S. Patent Application Publication No. US2013/0186710, entitled "ELEVATED WORKING PLATFORM AND RELATED METHODS," published Jul. 25, 2013, the entire disclosure of which is hereby incorporated by reference.

The apparatus 100 also includes a second assembly 108 having a pair of spaced apart rails 110 with a plurality of cross members 112 extending between, and coupled to, the spaced apart rails 110. In some embodiments, the cross members 112 may be configured as rungs such that rungs are accessible on both sides of the apparatus 100. Additionally, in other embodiments, the second assembly 108 may include "outer" and "inner" assemblies that enable the height of the apparatus 100 to be selectively adjusted such as noted above with respect to the first assembly 102. Additionally, it is noted that, in such embodiments, the first and second assemblies 102 and 108 may be independently adjustable such that they each may extend to varying elevations enabling the overall height of the apparatus to be selectively adjusted. In addition to the examples set forth in the previously incorporated document, such assemblies 102 and 108 may be constructed, for example, as described in U.S. Pat. No. 4,182,431, entitled "COMBINATION EXTENSION AND STEP LADDER RUNGS THEREFOR," the disclosure of which is incorporated by reference herein in its entirety. Further, examples of adjustment mechanisms for the selective elevation or height adjustment of such assemblies are described in the aforementioned U.S. Pat. No. 4,182,431, or it may be of a different configuration. Another example of such an adjustment mechanism is described in U.S. Patent Application Publication No. 2009/0229918 entitled "LADDERS, LADDER COMPONENTS AND RELATED METHODS," published Sep. 17, 1999, the disclosure of which is incorporated by reference herein in its entirety.

The first and second assemblies 102 and 108 may be formed of a variety of materials and using a variety of manufacturing techniques. For example, in one embodiment, the rails 104A, 104B, 110A and 110B may be formed of a composite material, such as fiberglass, while the rungs and other structural components may be formed of aluminum or an aluminum alloy. In other embodiments, the assemblies 102 and 108 (and their various components) may be formed of other materials including other composite materials, plastics, polymers, metals, metal alloys or combinations of such materials. Additionally, in one embodiment, the rungs may be coupled with their associated rails in a manner such as described in U.S. Pat. No. 7,086,499 entitled "LIGHT WEIGHT LADDER SYSTEMS AND METHODS," the disclosure of which is incorporated by reference herein in its entirety.

Figure 5:
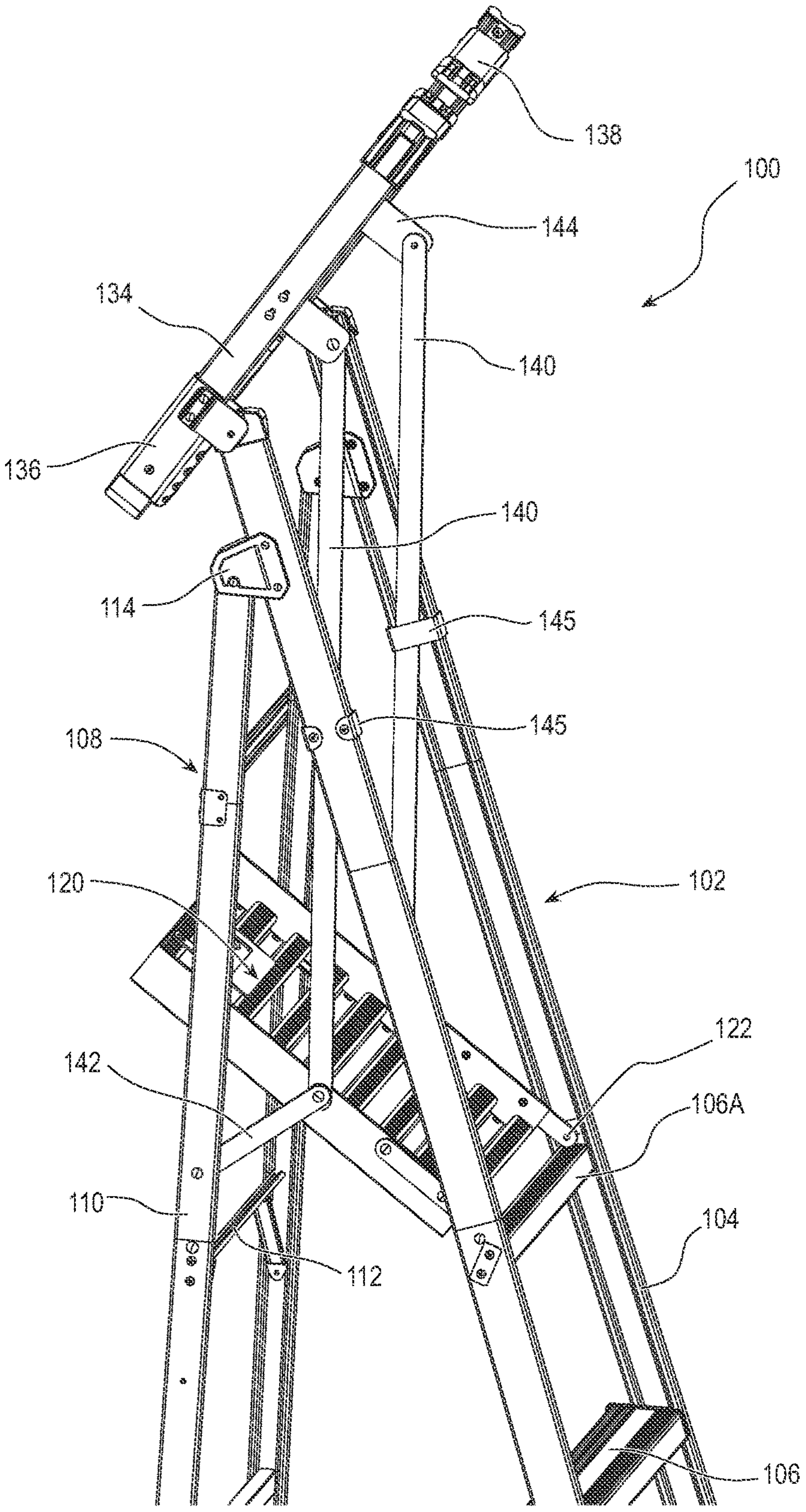
FIGS. 5-7 depict the upper portion of the elevated platform apparatus shown in FIG. 7 while in a transition to a closed or collapsed state.
Figure 6:
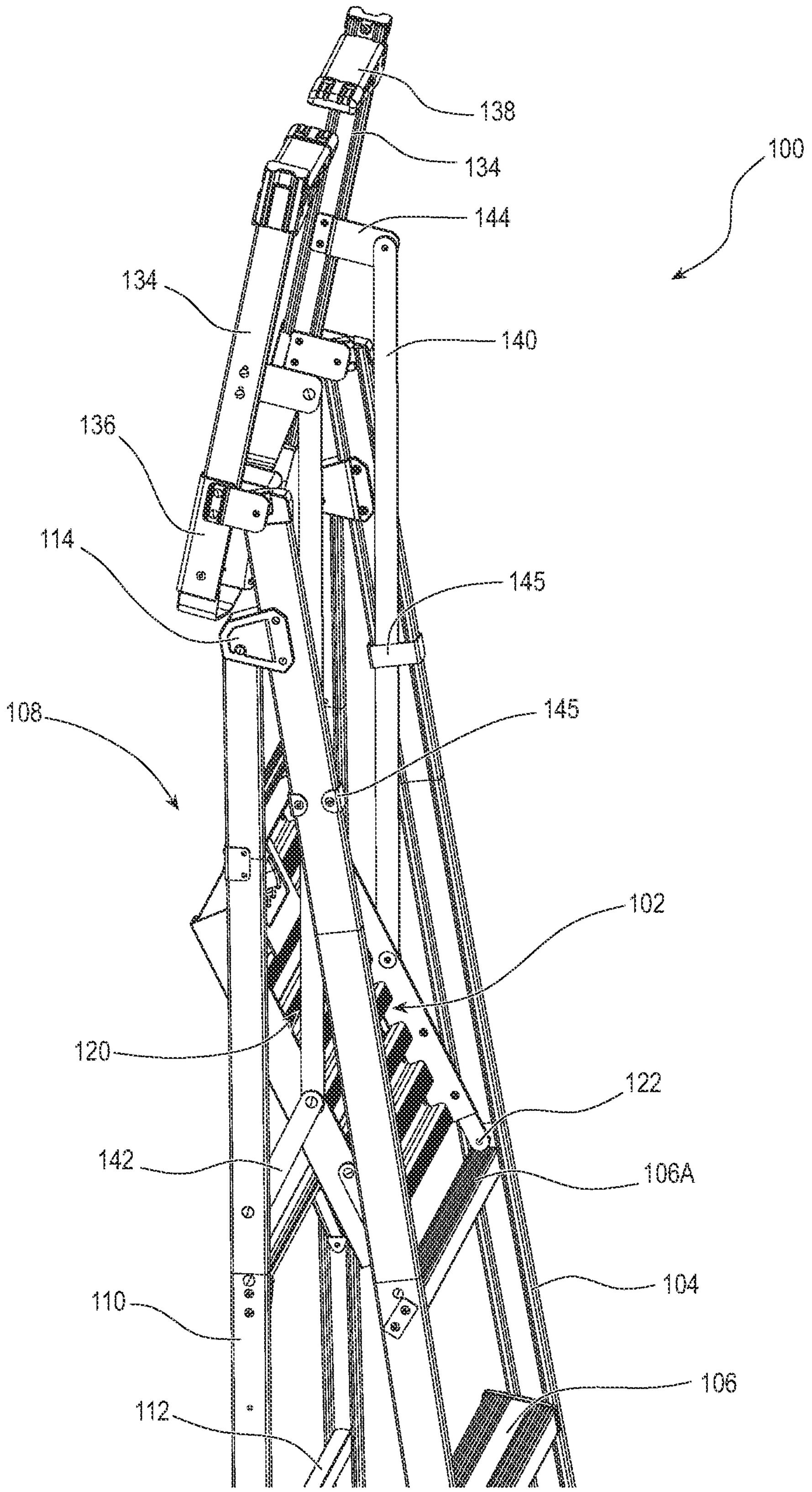
Figure 7:
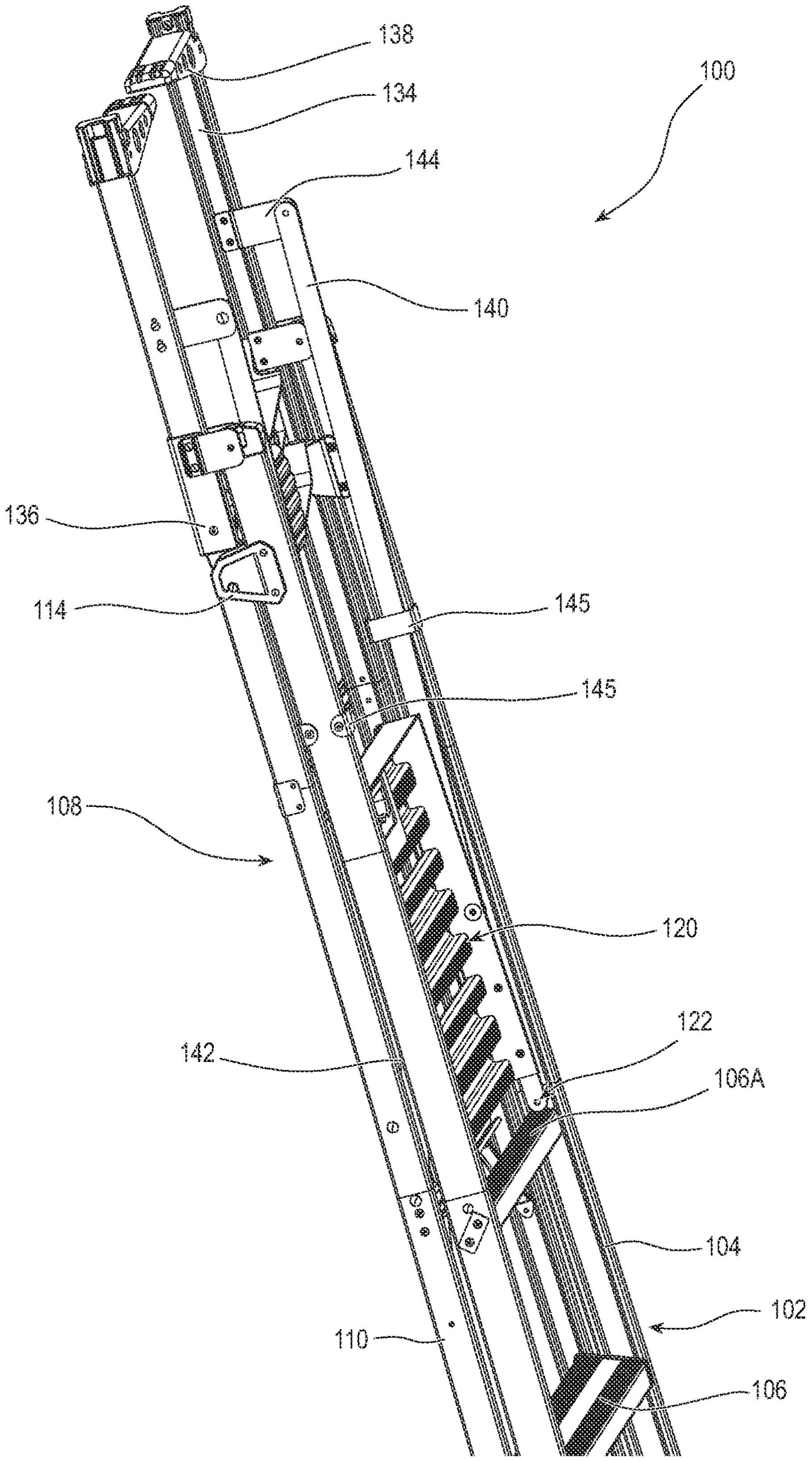

The assemblies 102 and 108 may be pivotally coupled to one another by way of pivot brackets 114 or hinge members enabling them to extend into a deployed condition (FIGS. 1 and 4) where they are positioned such that their lower ends are spaced apart from one another (creating a stable base for the apparatus 100), and collapse into a stowed condition where their lower ends are positioned relatively close to one another (see FIGS. 5 through 7 showing a transition between the deployed and collapsed states or conditions). The stowed state of the apparatus, and the transition between stowed and deployed states, will be discussed in further detail below. It is noted that traditional spreader mechanisms between the rails 104, 110 are not employed in the embodiment shown in FIGS. 1-7. Instead, a platform 120 extends between the first and second assemblies 102 and 108 locking the two assemblies in an open or deployed condition, as explained in further detail below.

The platform 120 is associated with the rail assemblies 102 and 108. The platform 120 is pivotally coupled with the first assembly 102 (e.g., with the rails 104 of the first assembly 102). For example, brackets and pivot structures 122 may be positioned on top of or directly above the uppermost rung 106A and pivotally couple the platform 120 to the side rails 104. The platform 120 may rest on one of the cross members 112 or other structural members of the second assembly 108 when the apparatus 100 is in a deployed condition (see, e.g., FIG. 1). In one embodiment, the platform 120 may simply rest on, and be supported by, a cross member 112 of the second assembly 108. In another embodiment, a latch or locking mechanism may be used to selectively lock the platform 120 in a deployed state as will be discussed further below. When in the working/deployed state of FIG. 1, the platform 120 provides an enlarged area or support surface for a worker to stand on comfortably and safely so that he or she can work at the highest support position of the apparatus 100. The platform includes a deck 124 having a working surface (i.e., the surface on which a user stands during use of the apparatus 100) and may include a toe-kick structure 126 along one or more sides of the deck 124. When in a deployed state, the upper surface of the deck 124 can be arranged substantially coplanar with the upper surface of the uppermost rung 106A.

A safety enclosure, referred to herein as a cage 130, may be spatially formed about the platform to encompass and surround a worker while he or she is standing on the platform 120. When designed appropriately, the provision of a cage 130 may reduce or eliminate the necessity of a worker needing to wear a harness and "tie off" while working on the apparatus 100. The cage 130 may include a first guard structure 132 positioned at a first elevation and that extends around most of the perimeter of the work space (e.g., at least three sides) that is situated above and generally defined by the outer perimeter of platform 120 combined with the uppermost rung 106A. In one embodiment, the first guard structure 132 may include pair of front-to-rear- and horizontally-oriented arms 134 coupled with a utility tray 136 (or another bar or structure extending between the arms 134). The utility tray 136 may be configured to store or hold a variety of supplies (e.g., paint, nails, screws, etc.) and/or tools (e.g., screw drivers, putty knifes, hammers, power tools, etc.). In some embodiments, the utility tray 136 can have a top recess with a movable lid for retaining items in the tray 136 even while the tray 136 is rotated or tilted. See, e.g., FIGS. 15 and 19-22. The cage 130 may also include a second bar or an uppermost cross-member 112A positioned between the platform 120 and the first guard structure 132 and extending between, and coupled to, the rails 110 of the second assembly 108.

One or more gates 138 (i.e., paddles, user retention gates, user retention latches, pivotable barriers, or front barriers) may be located on one side of the cage 130 at the ends of the upper arms 134 and may be configured to enable a user to climb the first assembly 102 and pass through the gates 138. The gates 138 can then automatically close behind the user after he or she passes into the interior of the cage 130 on the platform 120 past the gates 138. A number of components of the cage 130 may be coupled together using hinges or pivoting joints enabling them to be deployed and collapsed. For example, the guard structure 132 (e.g., the upper arms 134 and/or the utility tray 136) may be pivotally or hingedly coupled with the uppermost end (or a portion adjacent the uppermost end) of the rails 104 of the first assembly, as shown, for example, in FIGS. 5-7.

Additionally, a pair of link members 140 may be coupled between the lateral sides of the platform 120 and the upper arms 134 of the guard structure 132. For example, a link member 140 may have a first end pivotally coupled with one side of the platform 120 (e.g., at a location approximately midway between rails 104 of the first assembly 102 and the rails 110 of the second assembly 108) and a second end pivotally coupled to the guard structure 132 (e.g., at a location near a midspan of the associated upper arm 134 by way of a bracket member 144). In some embodiments, the link member 140 can be joined to the upper arm 134 directly through a portion of the upper bar 134, such as in the embodiment of FIGS. 19-22 at connection points 423.

Using a bracket member 144 can be beneficial in embodiments where the upper arm 134 comprises a material such as plastic or composite material prone to stretching, tearing, cracking, or has poor machining characteristics (e.g., fiberglass or carbon fiber composite) so that multiple distributed points of connection can be made between the bracket member 144 and the upper arm 134, thereby reducing localized stresses applied by the link member 140. An upper arm 134 comprising a more durable material (e.g., metal such as aluminum) can be connected to the link member 140 using a single point of attachment. See also FIGS. 19-22 and their related descriptions herein. Further, in the embodiment shown in FIGS. 1-7, the link member 140 is positioned laterally internal to the associated rail 104 (i.e., between the pair of rails 104 of the first assembly 102) and passes through a bracket member 145 configured to laterally constrain the link member 140 (i.e., the bracket member 145 keeps the link member 140 positioned immediately adjacent the rail at the location of the bracket member 145) while enabling the link member 140 to slide longitudinally (i.e., in a direction generally extending between the two ends of the link member 140). The other, second link member 140 may be similarly arranged on an opposite side of the platform 120.

Further, link members 142 may be coupled between the lateral sides of the platform and the second assembly 108 (e.g., the side rails 110). For example, a link member 142 may have a first end pivotally coupled with one side of the platform 120 (e.g., at a location between the rail 110 of the rear assembly 108 and the location of the pivotal connection of link member 140) and a second end pivotally coupled to the second assembly 108 (e.g., to an associated rail 110 of the second assembly 108). The other link member 142 may be similarly arranged on an opposite side of the platform 120.

The various pivotal couplings described herein (e.g., the link members being pivotally coupled with the platform, the rails or the guard structure; or the rails or guard structure being pivotally coupled with other components) may be considered to be "directly coupled" or "directly pivotally coupled" even though those couplings are effected by additional components such as brackets, shafts, hinge components or the like. Thus, for example, the upper end of the rails 110 of the second assembly 108 may be considered to be directly pivotally coupled with the rails 104 of the first assembly 102 even though there are bracket members and pivot pins or shafts that are used to effect such a coupling. Thus, it will be understood that the rails 104, 110 can be coupled to each other by a hinge having a pivot axis extending through both rails 104, 110 or through one of the rails (e.g., 110) and through a bracket or extension affixed to the other rail (e.g., 104).

The gates 138 may be configured, for example, to swing or pivot inwardly as the user passes through and between them while moving from the rungs 106 of the first assembly 102 onto the platform 120. The gates 138 can then automatically return (i.e., swing back) to the position shown in FIG. 1 (e.g., through the use of springs or other biasing mechanisms or actuators, as further discussed below), and then resist any force applied to either of them in an outward direction (away from the tray 136) to prevent a user from inadvertently stepping back through the gates 138 and falling from the platform 120. To exit the cage 130, a user may rotate the gates 138 inwardly (e.g., to the position of FIG. 10) and then pass through them while moving from the platform 120 to the rungs 106 of the first assembly 102 and then descending from the platform 120. While other embodiments are described below, some examples of self-returning gates are described in the previously incorporated U.S. Patent Application Publication No. US2013/0186710, the entire disclosure of which is hereby incorporated by reference. Other mechanisms, including springs or spring-biased hinges, may be used in association with the gates as well.

Still referring to FIGS. 1-7, the upper guard structure 132 may be positioned at a height, for example, that is between the waist height and the chest height of an average user (e.g., between approximately 3 feet and 5 feet above the platform 120). In one embodiment, the height of the guard structure may be adjustable to accommodate users of varying heights. In such a case, a minimum height may be defined per relevant safety standards or in accordance with appropriate design considerations. Additionally, in one embodiment, the guard structure 132 may be enlarged relative to the perimeter of the platform 120 such that the volume defined by the cage is larger than just the volume that would be defined by the perimeter of the platform 120 extended upwards. In other words, while a user may be able to stand on a relatively small surface area, the rest of the user's body may need more space to move about, especially if the user is wearing a tool belt or carrying other equipment needed to accomplish their task.

Stated another way, the perimeter of the upper portion of the cage 130 (such as may be defined by tracing a path starting at a free end of a gate member 138, extending around the guard structure 132, through the free end of the second gate member 138 and back to the free end of the first gate member 138) can be larger than the perimeter extending around the structure defined by the platform 120 combined with the uppermost rung 106A. Similarly, the area bound by the perimeter of the upper portion of the cage 130 in such an embodiment is larger than the area that is bound by the perimeter of the platform 120.

While not specifically shown in the drawings, the cage 130 may include netting or other components to further confine a user within the cage 130. This kind of flexible barrier may provide additional security in preventing a user from placing a foot or leg through the space defined between the platform 120 and the guard structure 132. Although not shown, the apparatus 100 may further include wheels associated with either or both of the assemblies 102 and 108, such as the wheels described in United States Patent Application Publication No. 2017/0226803, published Aug. 10, 2017, or in United States Patent Application Publication No.

2019/0078385, published Mar. 14, 2019 the disclosures of which are incorporated by reference herein in their entireties.

As shown in the drawings, the apparatus may further include feet 170 coupled to the bottom of the rails (104 and 110) that have appropriate engagement surfaces associated therewith to provide the apparatus 100 with the desired friction and stability when placed on a supporting surface. In one embodiment, the feet 170 may be configured to "snap-on" to the associated rail. For example, the feet 170 may be manufactured and assembled as described in U.S. Pat. No. 9,016,434, entitled "LADDERS, LADDER COMPONENTS AND RELATED METHODS" issued on Apr. 28, 2015, the entire disclosure of which is hereby incorporated by reference.

With continued reference to FIGS. 1-7, and as noted above, the platform 120 has a first end pivotally coupled with the first assembly 102 (e.g., directly pivotally coupled with the rails 104). When transitioning from a deployed state to a closed or collapsed state, as illustrated by FIGS. 5-7, the rails 104 of the first assembly 102 and the rails 110 of the second assembly 108 pivot closer towards each other about the pivot brackets 114 (or other pivot mechanisms) causing the second link members 142 to push the platform 120 upwards as it pivots about pivot structures 122 at the rails 104 of the first assembly 102. As the platform 120 pivots upwards, the first link members 140 push on the guard structure 132 causing it to pivot relative to the rails 104 of the first assembly 102. The guard structure 132 pivots in a direction such that the gate members 138 are displaced upward and away from the rails 104 of the first assembly 102 while the utility tray 136 is displaced downward and positioned adjacent the rails 110 of the second assembly 108, as shown in FIG. 7.

When in a completely folded or collapsed state, the arms 134 of the guard structure 132 are substantially parallel to the rails 104 of the first assembly 102 with the gate members 138 being the highest-most portion of the elevated platform apparatus 100. Additionally, when the ladder is in a collapsed or folded state, the deck 124 and the toe kick structure 126 may be positioned in a volumetric envelope that is defined by the front surfaces of the rails 104 of the first assembly 102 and the rear surfaces of the rails 110 of the second assembly 108. In other words, the platform 120 does not increase the thickness of the folded or collapsed elevated platform apparatus 100, the thickness being defined substantially by the rails 104 and 110 of the folded elevated platform apparatus 100.

Figure 8:
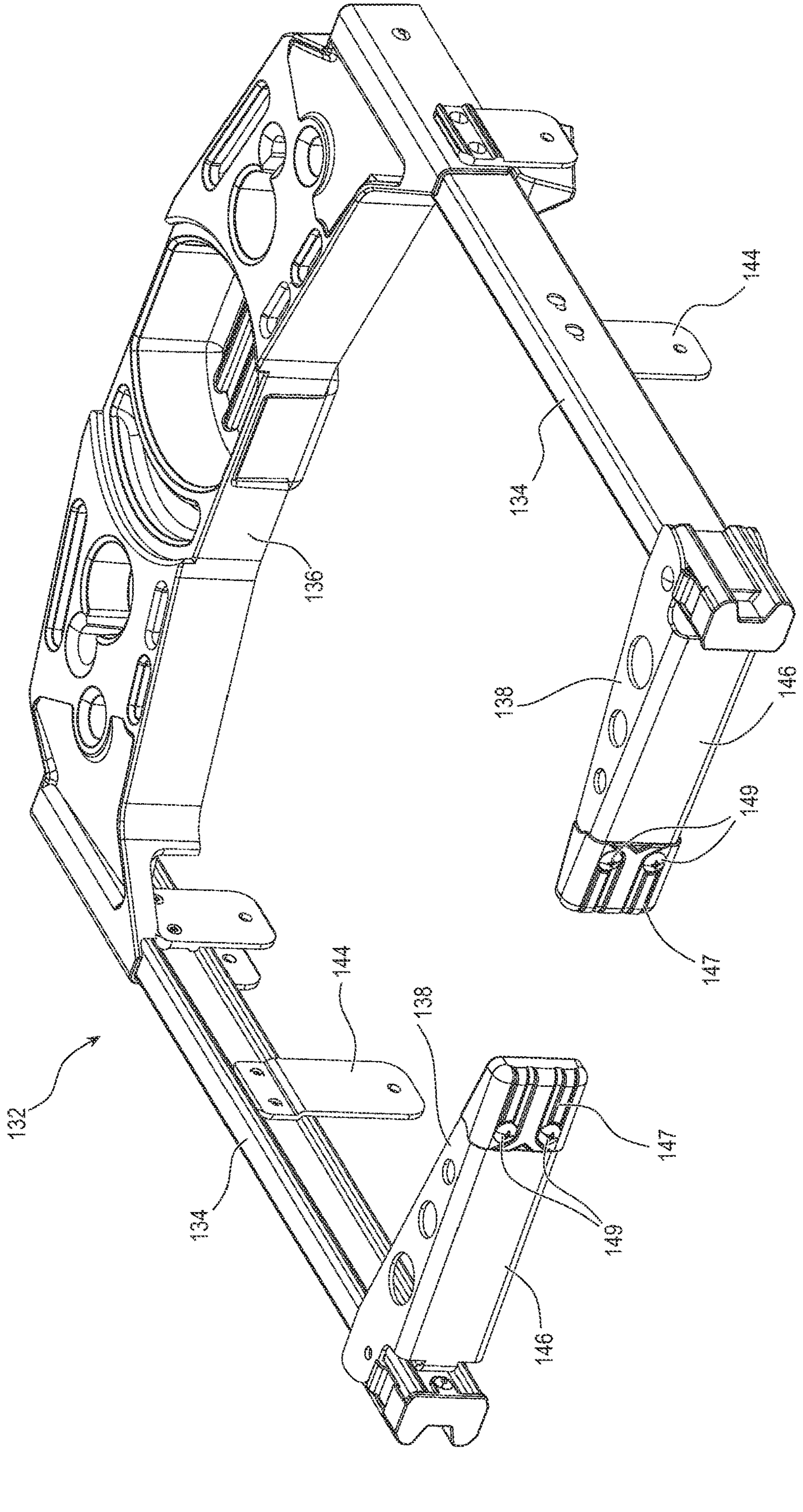
FIG. 8 is a front-side perspective view of various components of the platform apparatus of FIG. 1 including a pair of gate members in a closed state.
Figure 9:
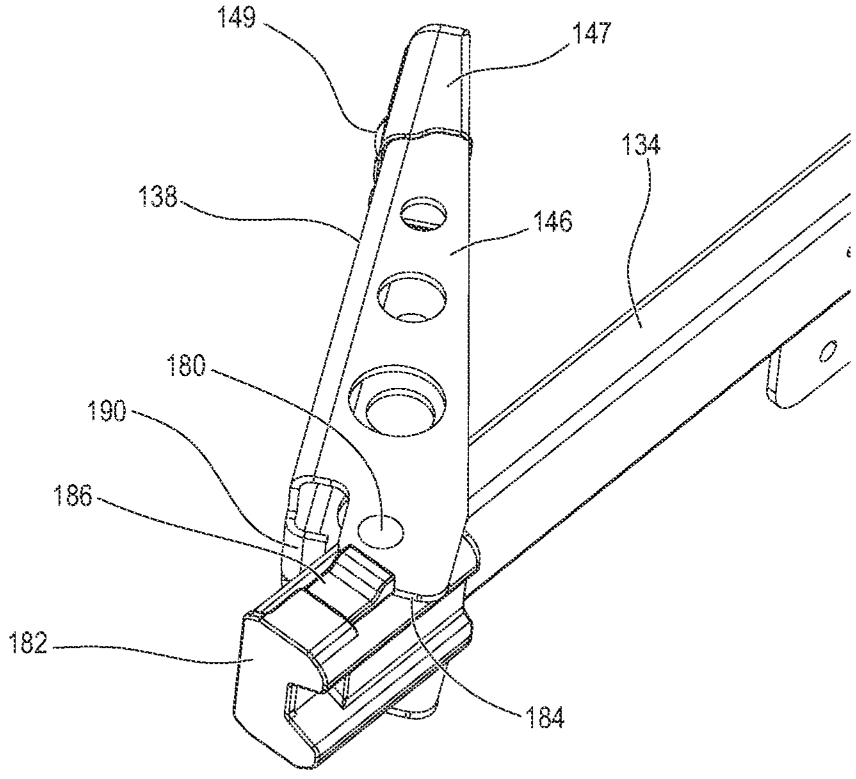
FIGS. 9 and 10 show a gate member in a transition state toward an open state as compared to that shown in FIG. 8.
Figure 10:
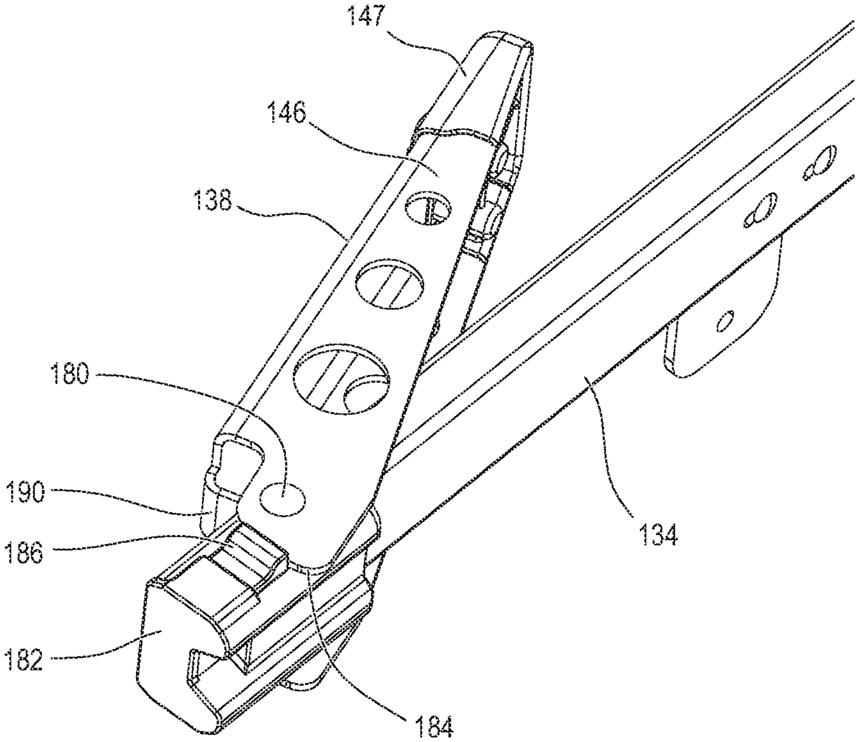
Figure 11:
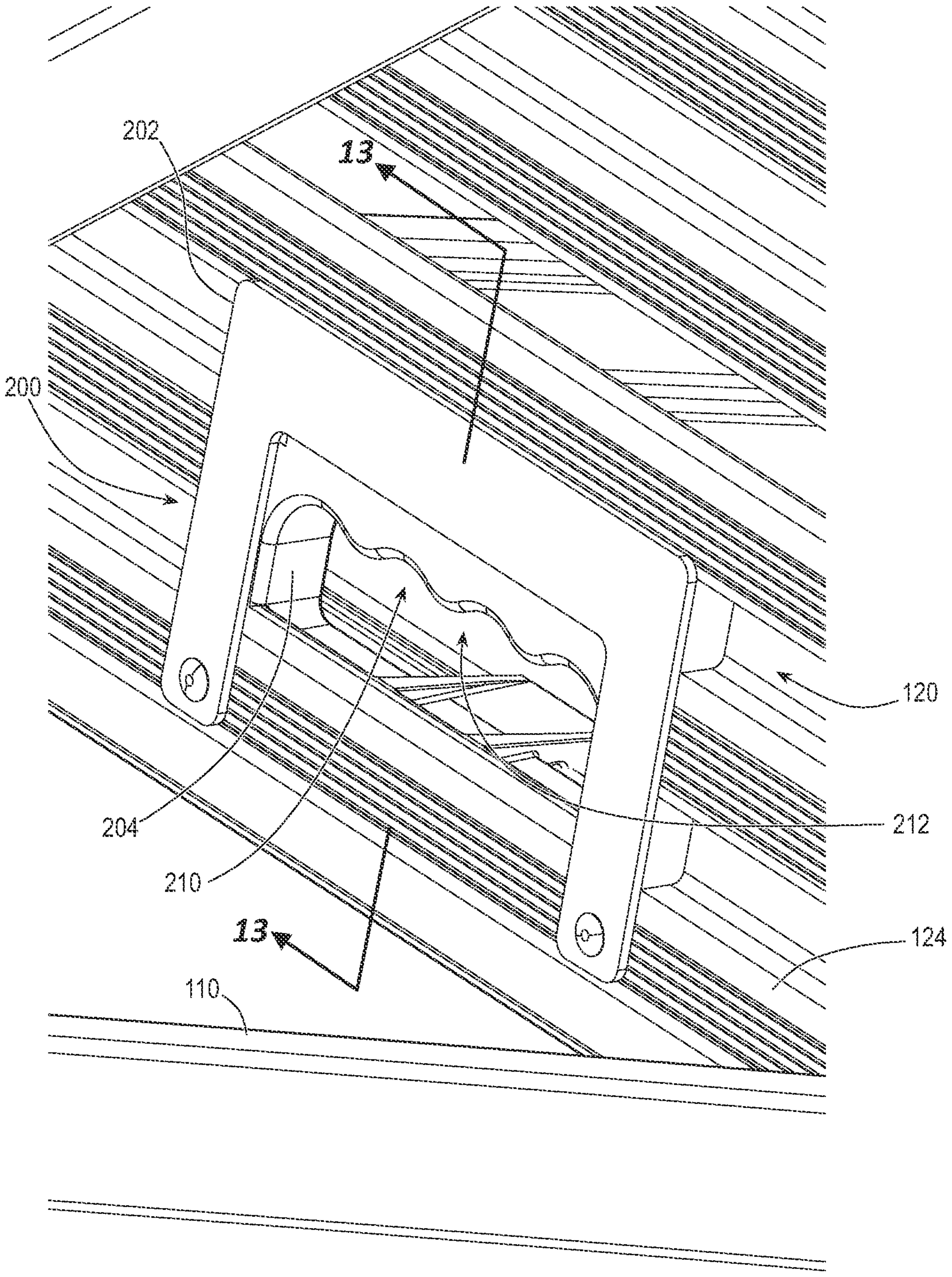
FIG. 11 shows details of further components of the elevated platform apparatus shown in FIG. 1.
Figure 12:
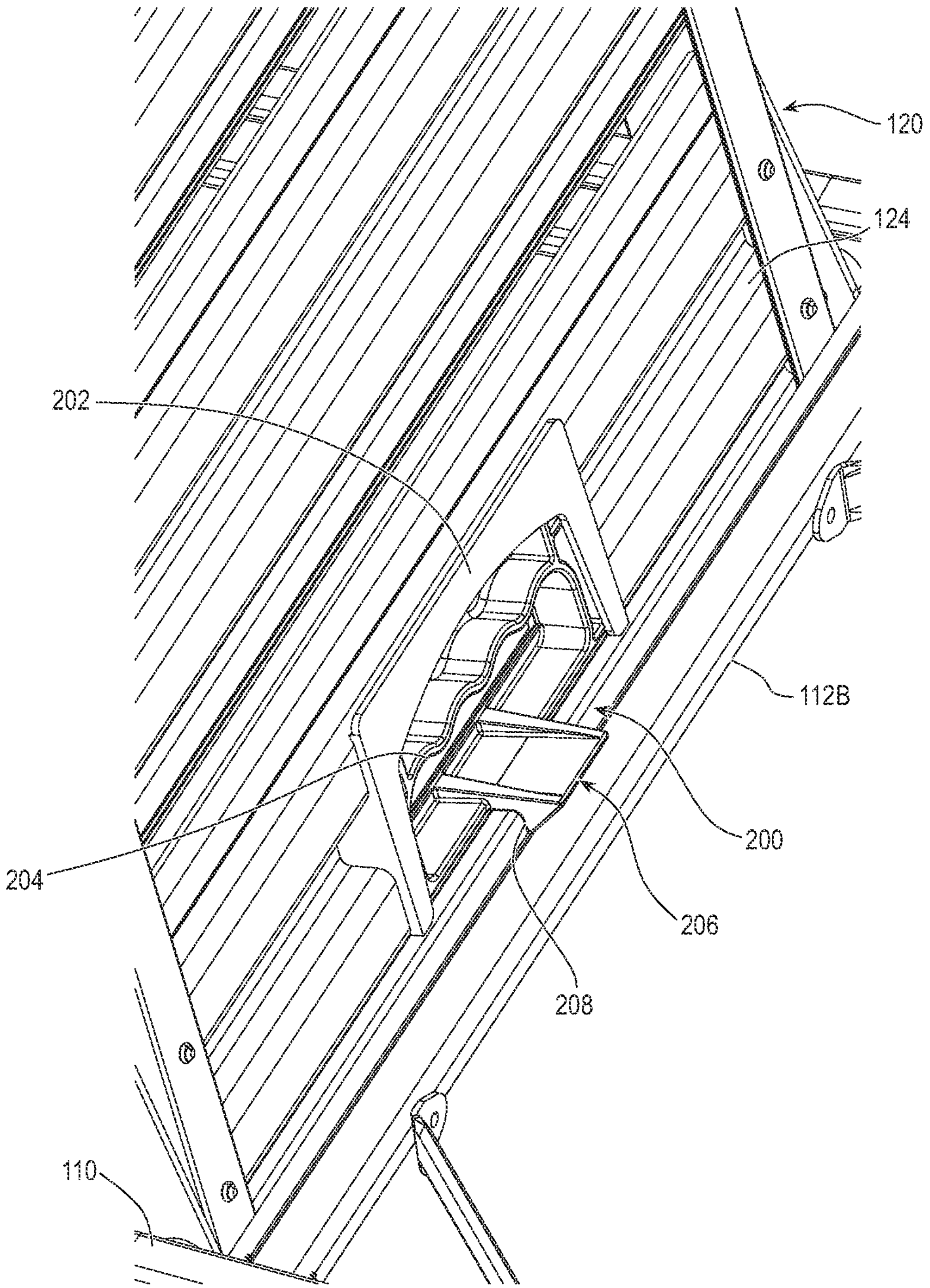
FIG. 12 shows additional details of certain components of the elevated platform apparatus shown in FIG. 1.

Referring now to FIGS. 8-10, further details of the gate members 138 are shown. Each gate member 138 may be pivotally coupled with an associated arm 134 of the guard structure 132 by way of a pin, shaft or other pivot structure 180. An end cap 182 may be coupled to an end of the arm 134. The pivoting end of the gate member 138 may include a cammed surface 184 that engages with an abutment member 186 associated with the end cap 182. The abutment member 186 is biased toward the cammed surface 184 of the gate member 138 (e.g., such as by a coiled spring or other biasing member positioned in the end cap 182). In other words, each abutment member 186 is biased rearward in a direction parallel to the major axis of its associated arm 134. Thus, as the gate member 138 receives a force to rotate it inwards (e.g., from the position shown in FIG. 8 to the position shown in FIG. 9, or from the position shown in FIG. 9 to the position shown in FIG. 10), energy is stored in the biasing member (e.g., the coil spring is compressed in the end cap 182). The stored energy of the coiled spring, combined with the arrangement between the cammed surface 184 and the abutment member 186, causes the gate member to return back to the position shown in FIG. 8 (and FIG. 1) when an external force is removed from the gate member 138. It is noted that FIGS. 8-10 show an upper portion of the gate member 138, but that a lower portion of the gate member 138 also includes a cammed surface for engagement with a portion of the same (or a different) biased abutment member. The gate member 138 may include a stop member 190 or stop surface that abuts a side surface of the arm 134 to stop the gate member from rotating back beyond the position shown in FIG. 8 (and FIG. 1).

Figure 13:
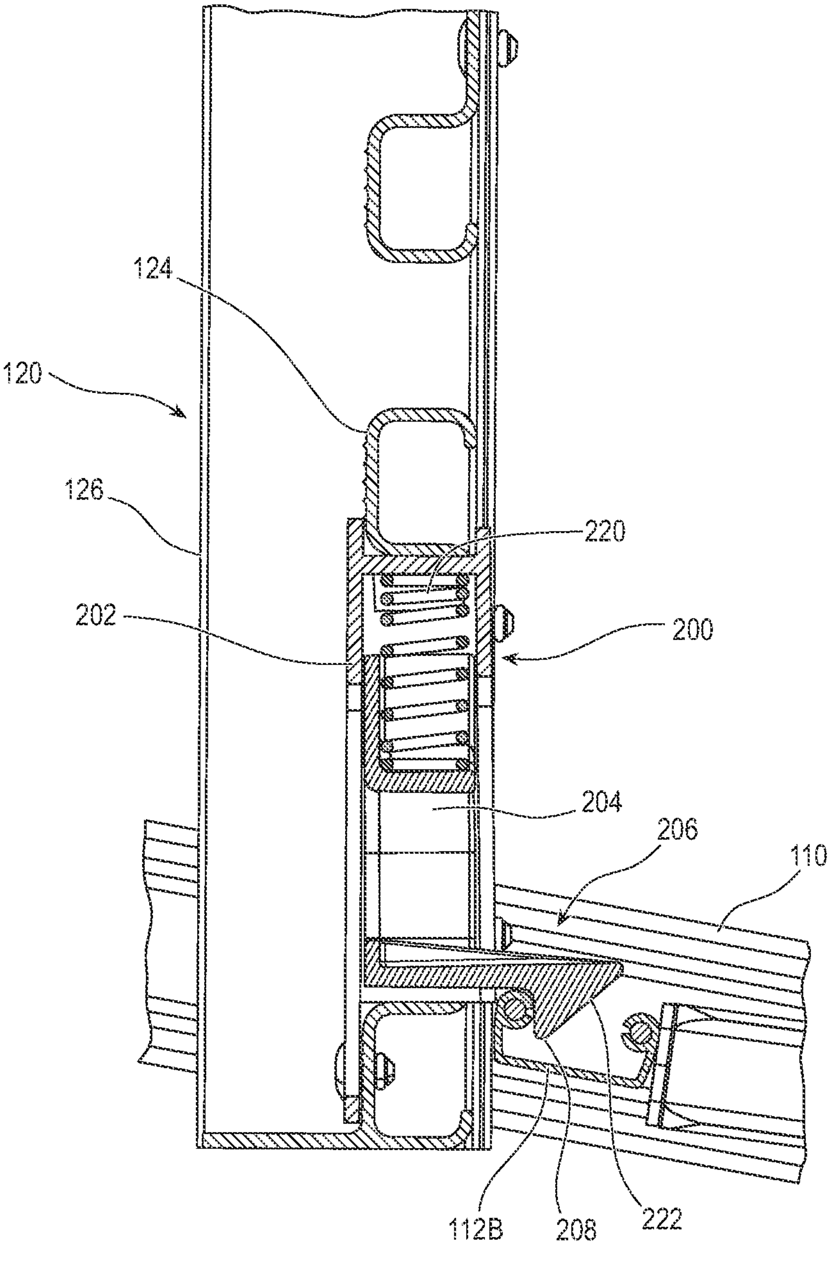
FIG. 13 shows a cross-sectional detail as indicated by arrows 13-13 in FIG. 11 with a mechanism in a first state.
Figure 14:
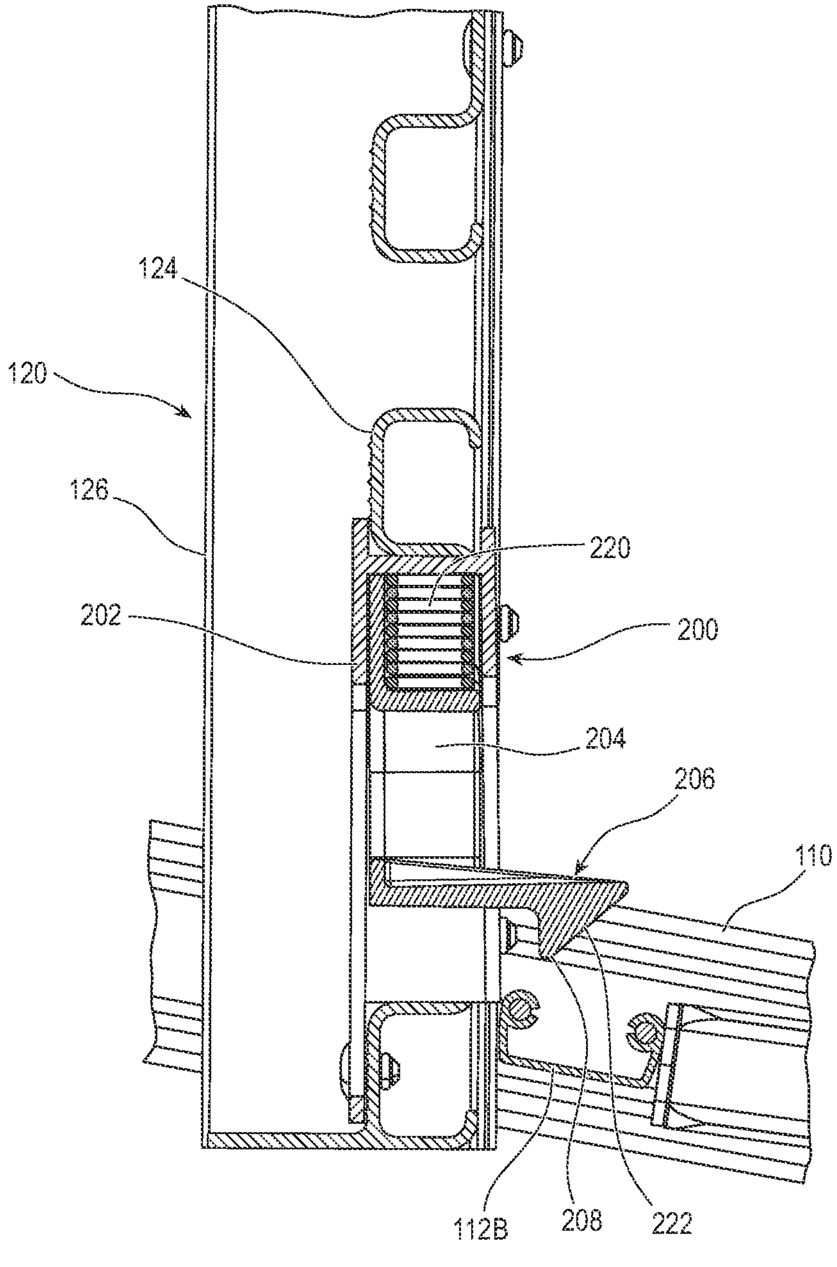
FIG. 14 shows the cross-sectional detail of FIG. 13 with the mechanism is a second position or state.

Referring now to FIGS. 11-14, an example of a locking mechanism 200 associated with the platform 120 is shown. The locking mechanism 200 may be positioned in an opening formed in the deck 124 of the platform. In one embodiment, the locking mechanism 200 includes a first body member 202 fixed to the deck 124 of the platform 120 and a second body member 204 slidably coupled to the first body member 202. The second body portion may include a latch member 206 configured to engage with a cross member 112B of the second assembly 108. For example, the latch member 206 may include a lip member 208 (i.e., a lip portion or hook portion) that is positioned beneath, and may abut, a crossbar section or ledge portion of the cross member 112B when the ladder is in a deployed condition and the platform 120 is resting on the cross-member 112B (see, e.g., FIG. 12 and the central cross-sectional side view of FIG. 13). Thus, the lip member 208 prevents the deck 124 from being displaced upwards away from the cross-member 112 when in the position shown in FIG. 13. When actuated by a user, the second body member 204 is slidingly displaced relative to the first body member 202 (e.g., toward the front rail 106A and parallel to the platform 120) such that the latch member 206 disengages from the cross-member 112B such as shown in FIG. 14. With the latch member 206 displaced and released from the cross-member 112B, the deck 124 may be displaced upward and away from the cross-member 112B.

The second, slidable body member 202 may include a contoured or undulating surface 210 for a user to grip with their fingers. Thus, to actuate the locking mechanism (to release it from a latched to an unlatched or unlocked state), a user may reach between the rails 104 of the first assembly 102, place their fingers in an opening 212 of the second body member 204, and pull against the contoured surface 210 toward the user. With the latching member 206 displaced from the cross-member 112B, the user can continue to pull upward with their fingers on the bottom of the second body member 204 (and/or first body member 202) to lift the deck 124 upward. With the deck 124 moving upward (i.e., the free end of the deck pivoting upward away from cross-member 112B), the ladder begins to collapse or fold such as described in association with FIGS. 4-7 above. In this manner, the locking mechanism 200 enables one-handed operation to unlock the platform 120, wherein only a single movement of second body member 204 needs to be induced with one hand of the user to disengage the locking mechanism 200 at the latch member 206 (as compared to traditional spreader mechanisms that would require unlocking a separate spreader on each lateral side of the ladder). Additionally, the user's hand can continue to pull from the same handle position on the second body member 204 to begin to collapse the elevated platform apparatus 100 from the spread or standing condition (FIG. 4) toward the collapsed condition (FIG. 7). A user can continue to pull on the second body member 204 toward the first assembly 102 to move from the mid-transition position of FIG. 5 to the advanced mid-transition position of FIG. 6 and eventually to the fully-collapsed position of FIG. 7. A user can pull in substantially the same horizontal direction throughout the motion of the platform 120 as the second body member 204 releases the latch member 206 and then begins to rotate upward about the pivot structures 122. Conveniently, the user can apply this pulling/collapsing force while standing in front of the first assembly 102 after descending from the rungs 106. In other words, the user does not need to move around the apparatus 100 after descending to unlock and fold the apparatus 100. Additionally, pulling on the second body member 204 with sufficient force can raise the rear feet 170 off of the ground surface in a manner that helps the rear rails 110 pivot at the pivot brackets 114, thereby further easing the transition to the fully-folded configuration. When the second body member 204 is released by a user, a spring 220 or other biasing member positioned between a portion of the first body member 202 and the second body member 204 cause the second body member 204 to return to the its first state. It is noted that the latch member 206 includes a ramped surface 222 that engages a portion of the cross-member 112B when the deck is being pivoted downward (when the elevated platform apparatus 100 is being transitioned into a deployed state), causing the second body member 202, and latch member 206, to be automatically displaced as the ramped surface 222 engages the cross-member 112B. See FIG. 13. The latch member 206 then automatically locks or latches onto the cross-member 112B as shown in FIG. 13 due to the biasing force of the spring 220 or other biasing member.

Figure 15:
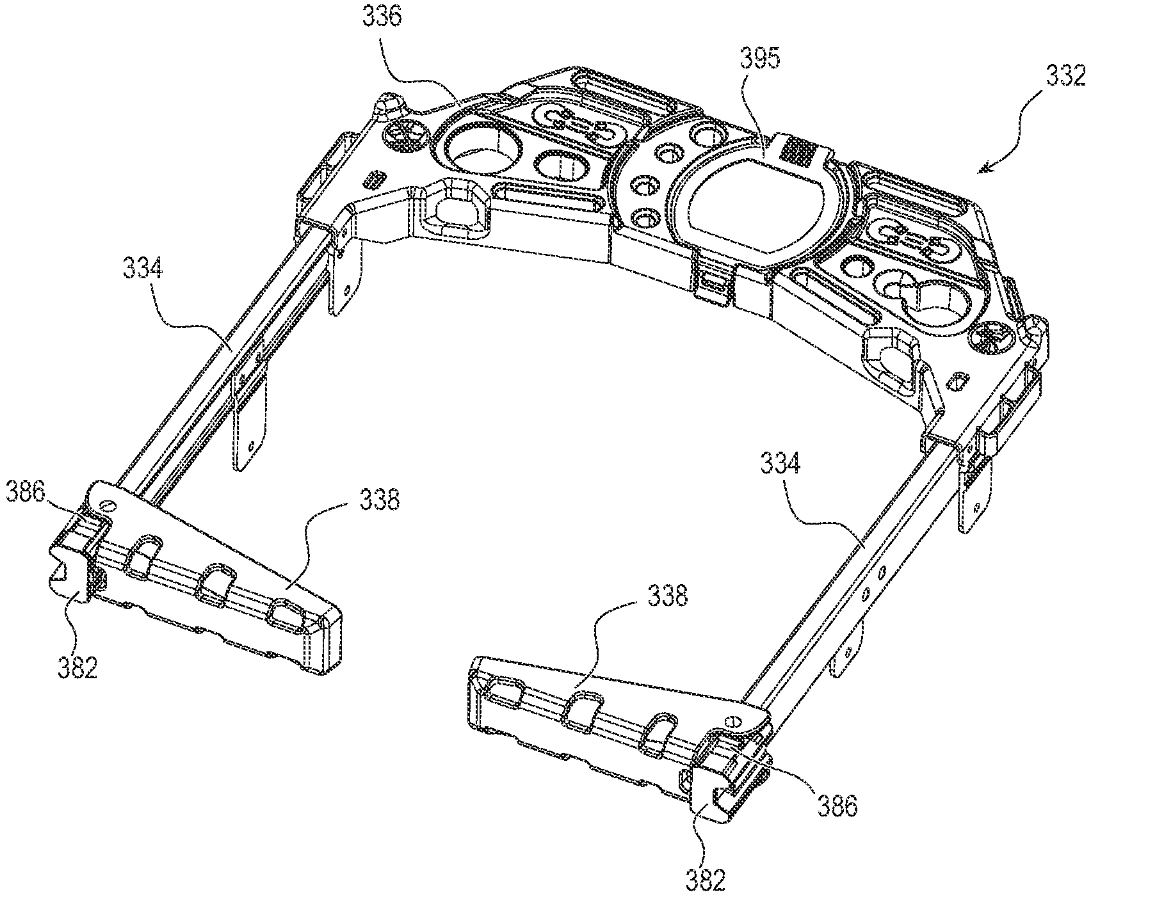
FIG. 15 shows a front perspective view of another embodiment of components of an elevated platform apparatus.
Figure 16:
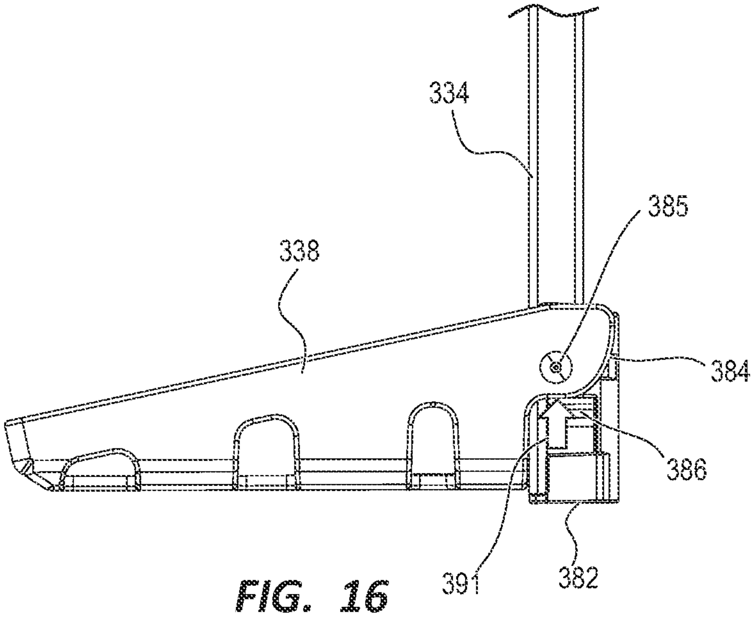
FIG. 16 shows a top view of a gate member of the embodiment of FIG. 15 in a closed position.
Figure 17:
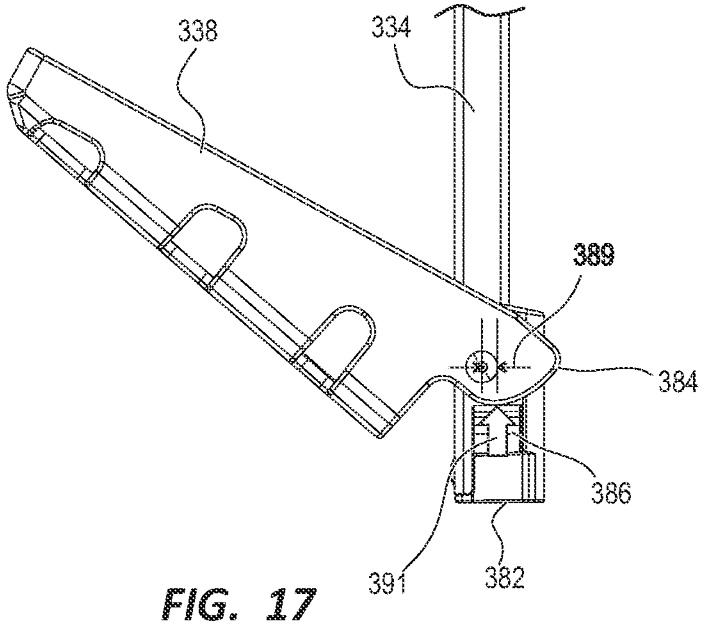
FIG. 17 shows a top view of a gate member of the embodiment of FIG. 15 in a transition position between the closed and open positions.
Figure 18:
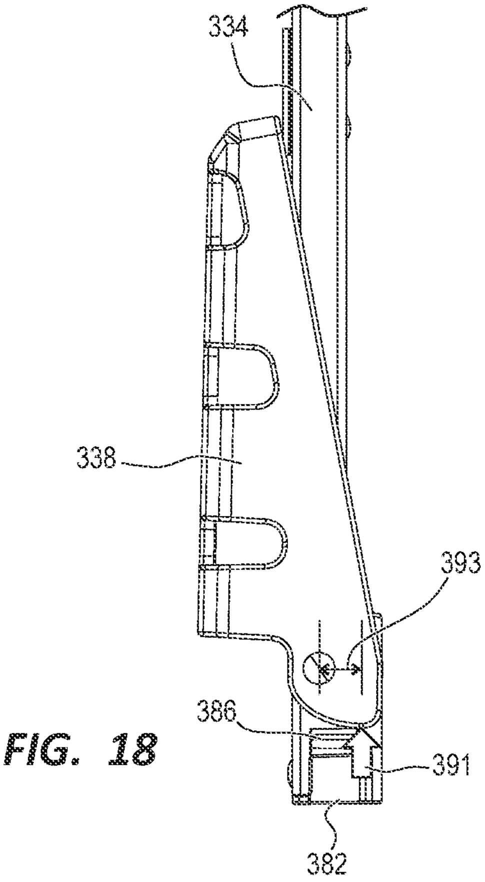
FIG. 18 shows a top view of a gate member of the embodiment of FIG. 15 in an open position.

FIG. 15 shows an embodiment of the guard structure 332 that can be used in place of the guard structure 132 of the preceding figures. The guard structure 332 includes a set of unitary gates 338. FIGS. 16-18 respectively show top views of a gate 338 in a closed position, a transition position, and an open position.

While the gates 138 comprise multiple assembled parts, including a body portion 146 and a tip guard 147 attached to the body portion via fasteners, adhesives, or another connector 149, the gates 338 of guard structure 332 have a single-piece, integral design and can be manufactured without assembling separate parts. The gates 338 can be pivotally attached to the arms 334 of the guard structure 332 and can be biased toward the position shown in the top view of FIG. 16 by a biasing member (e.g., spring) in the end cap 382 that urges abutment member 386 toward the tray 336.

Like gates 138, the gates 338 can include a cammed surface 384 to help bias the rotation of the gate 338 to the closed position (FIG. 16) from the open position (FIG. 18). While in the position of FIG. 16, the abutment member 386 applies a force 391 to a flat surface at the end of the cammed surface 384, as indicated by the arrow. As the cammed surface 384 rotates with the gate 338, its surface pushes the abutment member 386 away from the pivot axis 385 of the gate 338 in a direction opposite the arrow, as shown by the positions of the abutment member 386 in FIGS. 17 and 18. The moment applied to the gate 338 by the user drives rotation of the gate 338 and overcomes the biasing force of the biasing member within the end cap 382.

As shown by the position of the arrows (at 391) in FIGS. 16 through 18, the force 391 applied to the cammed surface 384 by the abutment member 386 also moves laterally farther away from the pivot axis 385 (shown in FIG. 16) as the gate 338 pivots closer to the open position of FIG. 18. In other words, the lateral distance 389 (shown in FIG. 17) from the pivot axis to the tangent/engagement point between the abutment member 386 and the cammed surface 384 increases to lateral distance 393 (shown in FIG. 18), and both distances 389, 393 are greater than any offset of the force 391 in FIG. 16. This means that, for a substantially linear spring biasing member, the torque or moment applied to the gate 338 by the abutment member 386 increases as the gate 338 opens (i.e., moves toward the position of FIG. 18) and decreases as the gate closes (i.e., moves toward the position of FIG. 16) due to respectively increasing/decreasing the moment arm between pivot axis 385 and abutment member force 391. As a result, the gate 338 can smoothly pivot from the open position to the closed position when released from the open position. In other words, the torque and moment applied to the gate 338 by the abutment member 386 decreases as the gate nears the closed position as compared to the torque and moment applied in the open position. This can improve the user experience by eliminating a harsh and jarring snap-back movement of the gate 338 when it is released from the open position. Additionally, the gate 338 can remain in the closed position when no outside moment is being applied, and the gate 338 can easily move away from the closed position as a user enters the platform but gradually ramps up resistance to further rotation the closer it gets to the fully open position. The biasing force applied by the abutment member 386 can be selected to provide a preferred amount of resistance to gate opening and/or keeping the gate open. These behaviors also apply to gate 138 with its cammed surface 184.

Figure 19:
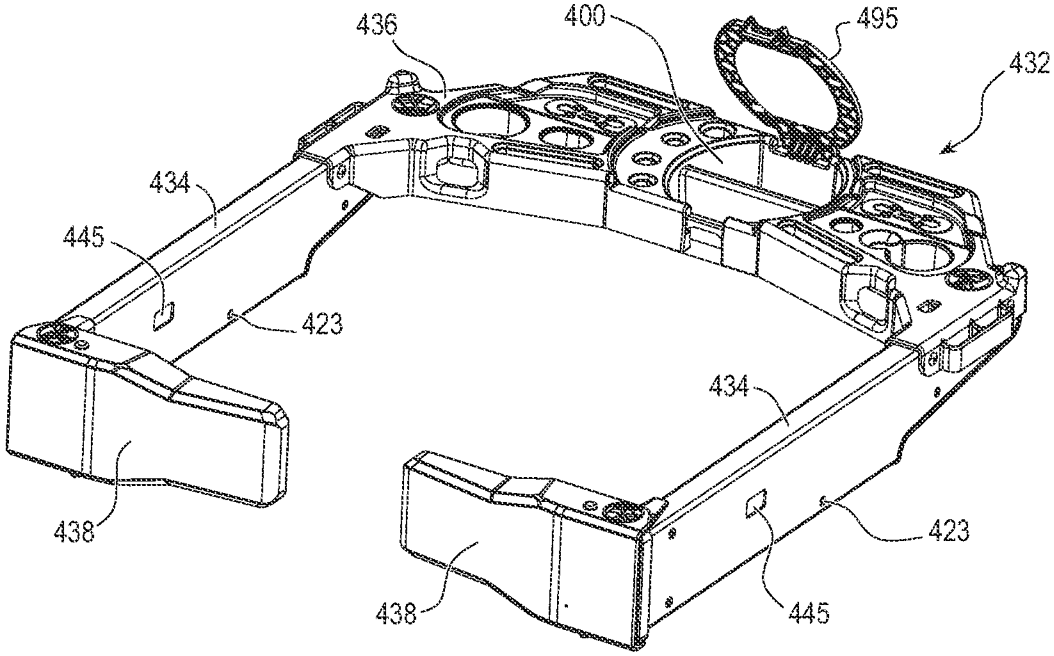
FIG. 19 shows a front perspective view of another embodiment of components of an elevated platform apparatus.

A lid 395 can be used to cover and close at least one recess or cavity in the tray 336. The lid 395 can be pivotally connected to the tray 336 on one end and can be releasably latched to the tray 336 on its opposite end. Accordingly, a user can release the latch and pivot the lid 395 to access the recess or cavity in the tray 336. For example, FIG. 19 shows a view of an embodiment of a tray with the lid pivoted open to reveal a pair of internal chambers 400. The lid 395 can beneficially be used with the tray 336 to keep items held on the tray 336 from falling off the tray 336 or out of the recess when the guard structure 332 is rotated to a collapsed position and the top surface of the tray 336 is substantially vertically oriented. In some embodiments, multiple lids can be used to control access to various different recesses in the tray 336.

FIG. 19 shows a perspective view of an embodiment of a guard structure 432.

Features of guard structures 132 and 332 can be implemented with guard structure 432, such as the lid 495 functioning like lid 395 and tray 436 functioning like tray 136 or 336. In this guard structure 432, the arms 434 can be vertically taller when in the deployed configuration (e.g., the configuration of FIG. 4) as compared to arms 134. The arms 434 can be directly pivotally coupled to the link members 140, without intervening bracket members 144, at connection points 423 on the arms 434. The arms 434 can be constructed of a metal material such as, for example, aluminum, which can be extruded to a desired shape and length and can securely hold the link members 140 and rotate when the link members 140 push up on the arms 434 at the connection points 423.

Figure 20:
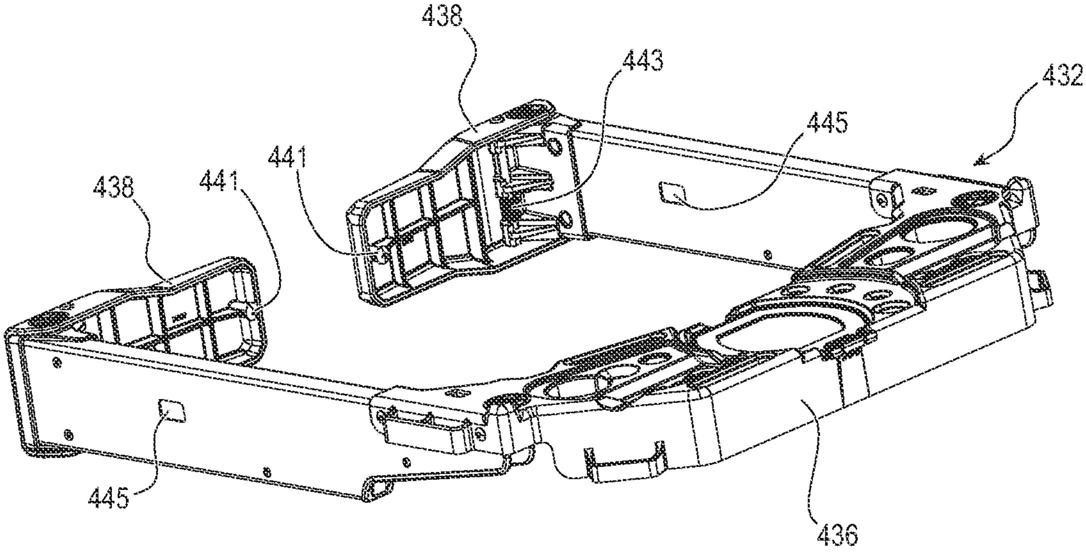
FIG. 20 shows a rear perspective view of the embodiment of FIG. 19.
Figure 21:
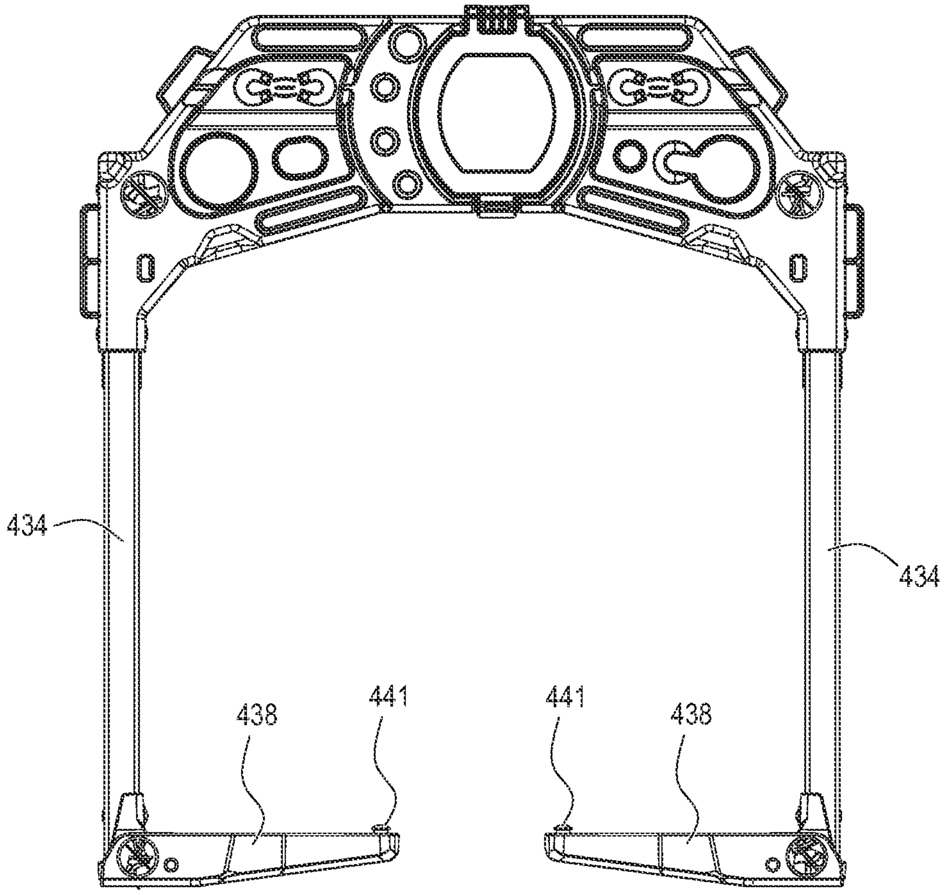
FIG. 21 shows a top view of the embodiment of FIG. 19 with gates shown in a closed position.

A pair of gates 438 can be pivotally attached to the ends of the arms 434 opposite the tray 436, as in other embodiments herein. As shown in FIGS. 20-21, the gates 438 can each include a latch portion 441 protruding substantially parallel to the arms 434 when the gates 438 are in the closed position (i.e., FIGS. 19-21). A pair of biasing members (e.g., torsion springs 443 in FIG. 20) can be used to bias the gates 438 to the closed position at an about 90 degree angle relative to the arms 434.

Figure 22:
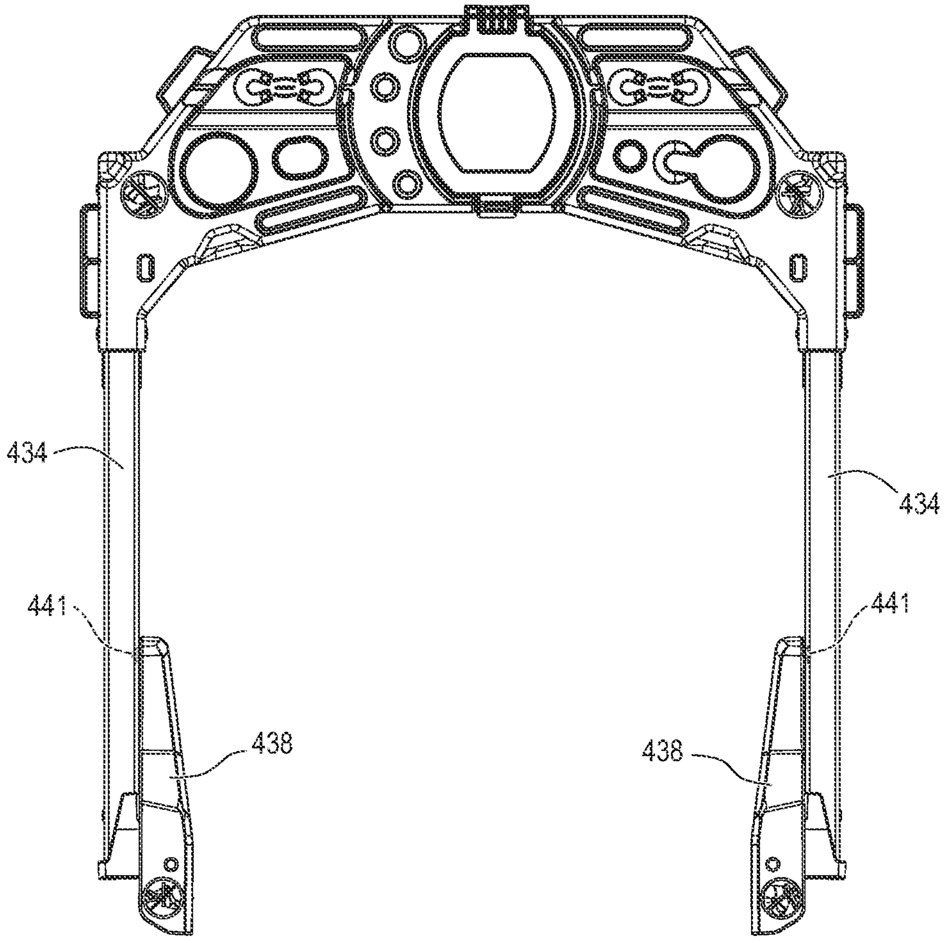
FIG. 22 shows a top view of the embodiment of FIG. 19 with gates shown in an open position.

The latch portions 441 of the gates 438 can protrude from a rear-facing side of the gates 438 and can be rotated with the gates 438 to a position in which the latch portions 441 are received into openings 445 in the arms 434, as shown in FIG. 22. The latch portions 441 can comprise a flexible material (e.g., elastomeric rubber or flexible plastic) that can enable them to snap into place in the openings 445 or flex and rebound when inserted into the openings 445. In some embodiments, the latch portions 441 can be press-fit into openings 445. The latch portions 441 can have a mushroom-like shape with a terminal head portion broader than a stem portion that links the head portion to the gate 438. As a result, the latch portions 441 can be retained in place in the openings 445 once moved to the open position of FIG. 22. The latch portions 441 are shown in broken lines in FIG. 22 to show that they penetrate into the openings 445 of the arms 434. Accordingly, the gates 438 can have their inner faces abutting the inner faces of the arms 434, thereby affording maximized freedom of movement of the user on the platform while the gates 438 are completely open. The user can apply a torque to the gates 438 to release the latch portions that provides sufficient force to detach the latch portions 441 from the openings 445 and to then allow the gates 438 to spring back into the closed positions (FIG. 21) in response to potential energy released by the torsion springs 443 that biases the gates 438 to their closed positions. The openings 445 can extend entirely through the arms 434 (as shown in FIGS. 19 and 20) so that a user can insert a finger or tool into the outer side of the arm 434 through the opening 445 to press against a latch portion 441 to release a gate 438. Alternatively, the user can grasp and pull the end of the gate 438 adjacent to the latch portion 441 and move it away from the arm 434 to release the latch portion 441.

While the invention may be susceptible to various modifications and alternative forms, specific embodiments have been shown by way of example in the drawings and have been described in detail herein. Components, features and aspects of one embodiment may be combined with components, features and aspects of other embodiments, including embodiments incorporated by reference. It should be understood that the described embodiments are not intended to be limited to the particular forms disclosed. Rather, the invention includes all modifications, equivalents, and alternatives falling within the spirit and scope of the invention as defined by the following appended claims.

What is claimed is:

1. An elevated platform apparatus comprising:

a first assembly having a first pair of rails coupled with a plurality of rungs;

a second assembly having a second pair of rails and a cross member extending between and coupled to the second pair of rails, the second assembly being pivotally coupled with the first assembly, the first assembly and second assembly being displaceable between a deployed state and a collapsed state;

a platform pivotally coupled to the first assembly, the platform having a deck with an upper surface that is substantially coplanar with an upper surface of an uppermost rung of the plurality of rungs when the first and second assemblies are in the deployed state;

a latch mechanism associated with the platform, the latch mechanism including a latch member configured to be selectively horizontally slidably displaced away from the cross member and toward the uppermost rung to disengage the latch member from the cross member;

a cage associated with the platform, the cage including a guard structure pivotally coupled to the first pair of rails.

2. The apparatus of claim 1, wherein the latch mechanism is positioned in an opening formed in the deck of the platform.

3. The apparatus of claim 2, wherein the latch mechanism includes a first body member fixed to the deck and a second body member slidably coupled with the first body member, the second body member including the latch member.

4. The apparatus of claim 3, further comprising a biasing member positioned between the first body member and the second body member, the biasing member biasing the second body member toward the cross member.

5. The apparatus of claim 4, wherein the second body member includes an undulating surface for engagement by a user's fingers.

6. The apparatus of claim 5, wherein the latch member includes a ramped surface configured to engage the cross member and displace the second body member when the first and second assemblies are transitioning from the collapsed state to the deployed state.

7. The apparatus of claim 1, wherein the guard structure comprises a gate member including a cammed surface configured to engage a biased abutment member coupled with the guard structure.

8. The apparatus of claim 1, wherein the guard structure comprises a gate member configured to swing in a first direction upon a user stepping on to the platform from the first assembly and to swing to a closed position after the user is standing on the platform, the at least one gate also being limited from being displaced in a second direction, opposite the first direction, beyond the closed position.

* * * * *